Feb. 10, 1925.                                                              1,526,128
A. FLOHR
SAW GUARD
Filed Oct. 20, 1923            2 Sheets-Sheet 2

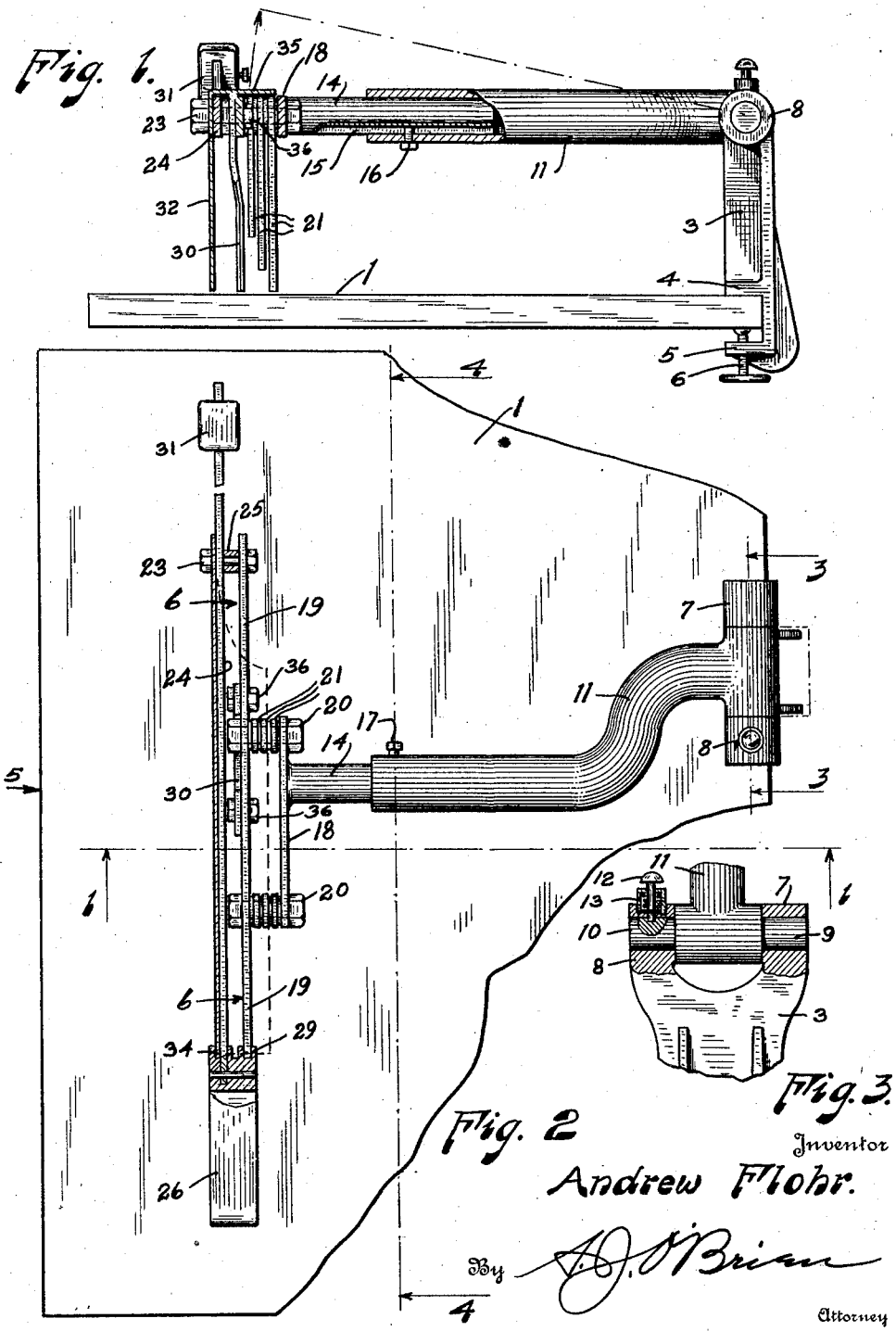

Inventor
Andrew Flohr.
By
Attorney

Patented Feb. 10, 1925.

1,526,128

UNITED STATES PATENT OFFICE.

ANDREW FLOHR, OF COLORADO SPRINGS, COLORADO.

SAW GUARD.

Application filed October 20, 1923. Serial No. 669,731.

*To all whom it may concern:*

Be it known that I, ANDREW FLOHR, a citizen of the United States, residing at Colorado Springs, county of El Paso, and State of Colorado, have invented certain new and useful Improvements in Saw Guards; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to saw guards and has special relation to guards for circular saws.

Among the tools employed in woodworking, it may safely be said that the circular saw, which is so extensively employed, is responsible for the greatest number of serious accidents. In order to diminish the accidents due to this machine, it has been proposed that the same shall be provided with some guard means which will make it impossible for the operator to get his hands or fingers into such position that they are injured by the saw. It is essential, however, that the guard shall be so designed and constructed that it will not appreciably diminish the usefulness of the saw, as it is primarily intended for service and any guard that interferes with its successful and efficient operation is, of course, objectionable.

It is the object of this invention to produce a guard that shall be so constructed and designed that it will keep the saw covered so fully and completely that the operator, unless he is guilty of extreme negligence, will be fully protected from injury and which will, at the same time, not interfere with the proper operation of the saw.

The above and other objects, which will appear as the description proceeds, are obtained by means of a construction which I will now proceed to describe in detail, reference being had for this purpose to the accompanying drawings in which my invention is shown in its preferred form, and in which:

Fig. 1 is a vertical section taken on line 1—1, of Fig. 2, with a portion of the supporting arm broken away;

Fig. 2 is a plan view of a saw table with my guard in place thereon, a part of the view being shown as a section taken on line 2—2, of Fig. 4;

Fig. 3 is a section taken on line 3—3, of Fig. 2;

The same reference characters will be used to designate the same parts throughout the several views.

Numeral 1 represents the table of a circular saw machine and 2 the saw blade, which is operatively connected thereto. I have not gone into detail concerning the construction of the sawing machine, as this has nothing to do with my invention, the saw and the saw table being shown merely for the purpose of better describing the guard which forms the subject matter of this application.

Figure 4:
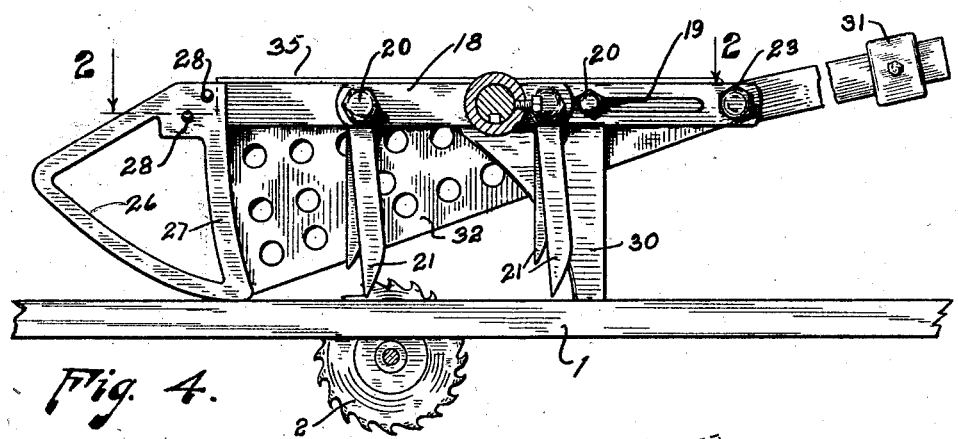
Fig. 4 is a section taken on line 4—4, of Fig. 2.
Figure 5:
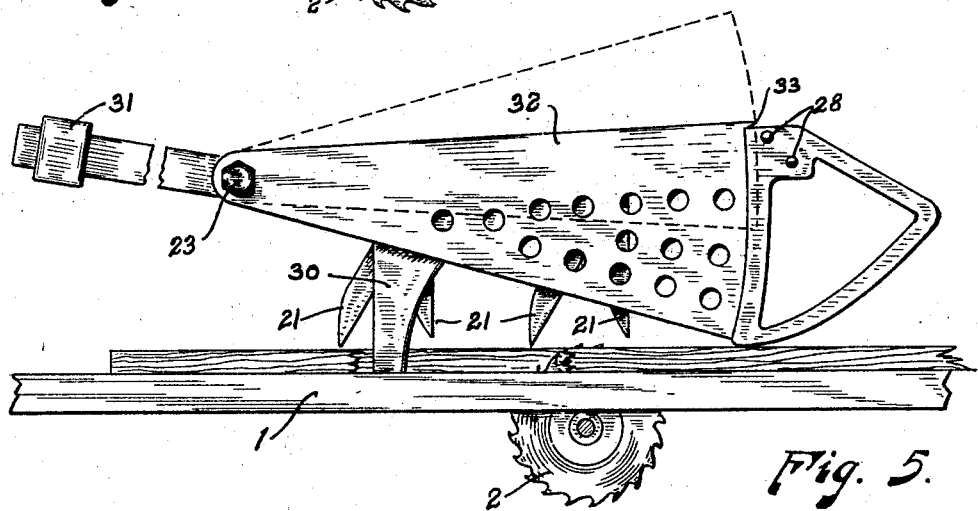
Fig. 5 is an end elevation looking in the direction of the arrow 5 in Fig. 2.
Figure 6:
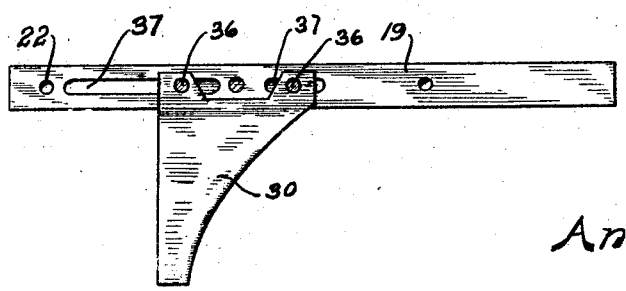
Fig. 6 is a view looking in the direction of the arrows 6—6, in Fig. 2.

To the edge of the table on the right of the saw blade 2, I secure a bracket 3 which has a pair of spaced stationary jaw members 4 and 5. To the lower one (5) of these jaws, there is threadedly connected a pair of clamping screws 6 by means of which the bracket 3 is firmly secured to the table. Any other means for securing the bracket in place may be employed, but the one described has proven to be both practical and efficient. The upper end of the bracket 3 is provided with spaced journals 7 and 8 for the reception of the trunnions 9 and 10, which are non-rotatably secured to the end of arm 11. Trunnion 10 has several ratchet teeth on its outer surface and these are so located that they cooperate with the pawl 12 which is impelled towards the trunnion by the action of the spring 13. The purpose of the pawl and ratchet arangement is to hold the arm 11 in the desired relation with respect to the tables. The normal or operative position of arm 11 is shown in full lines in Fig. 1 and the inoperative position being indicated by a dot and dash line. Arm 11 is hollow and has telescopically connected thereto a cylindrical member 4, which has on one side a longitudinal groove 15 for the reception of the end of a screw 16, which cooperates with the groove to prevent relative rotation of members 11 and 14. A set screw 17 serves to clamp member 14 against longitudinal movement. Secured to the outer end of member 14 is a rectangular bar 18 from which the remaining parts of the guard are supported. A transverse bar 19 is secured to the bar 18 by means of bolts 20. Supported from bolts 20 are a plurality of dogs 21 whose function it is to engage the upper surface of the material sawed in the manner shown in Fig. 5 so as to prevent the same from being thrown from the table by the action of the saw. As shown in the drawings I preferably employ two sets of dogs, each set consisting of three dogs of different lengths so as to most effectively cooperate with a variety of different thicknesses of material. Bar 19 has a hole 22 near its rear end, for the reception of a bolt 23, which serves as a pivot for the movable bar 24. A ferrule 25 spaces the movable bar 24 from the stationary transverse bar 19. To the front or free end of the movable bar, I secure a guard member 26 which is substantially triangular in shape with its side 27 curved on the arc of a circle whose center is bolt 23. The guard member 26 is firmly secured to the free end of the movable bar 24 by means of bolts or rivets 28. The curved side 27 has one groove 29, which receives the front end of the stationary bar 19, which serves as a guide for the guard as it swings about its pivot 23. The guard 26 is of such size that when its lower corner rests upon the upper surface of the table, the movable bar 24 is substantially horizontal, in the manner shown in Fig. 4, although this is obviously not a necessary condition. The parts are so located that the bar 19 lies directly over the saw so that in case any portions of the latter should break and fly off, they will strike the lower edge of the bar. A spreader 30 is fastened to bar 19 and has its lower end extending into the saw slot in the table. Movable bar 24 extends to the rear of the pivot 23 and is provided with an adjustable counterweight 31 which can be fastened in such a position that it permits the guard to be moved upwardly with but little effort. To protect the saw from the side, I provide a sector-shaped sheet metal guard 32 that is pivoted at 23, the arcuate end 33 extending into a groove 34 in the arcuate portion 27 of the guard 26. Guard or shield member 32 may be raised into the position shown by dotted lines in Fig. 5 whenever it is necessary to do so. The upper edge of the guard 32 is bent over to one side in the manner indicated by number 35. This edge forms a stop for the sawdust and prevents it from being thrown into the face of the operator. The stationary bar 19 has two slots 37 to which the spreader securing bolts 36 pass.

The operation of my device is as follows:—The parts being assembled in the manner above described, are secured to the right hand edge of the table and adjusted so that the spreader 30 enters the saw slot to the rear of the saw. This brings the stationary transverse bar 19 directly above the saw blade. The counter-weight 31 is then adjusted to such a position that the guard member 26 rests lightly on the upper surface of the table. The material to be sawed is shoved under the guard member and against the saw, the guard rising and resting on the upper surface of the work in the manner shown in Fig. 5. The dogs 21 slide along the upper surface of the work and prevent its withdrawal. When, for any reason, it is found desirable to move the guard out of the way, it can be raised as indicated in Fig. 1 and will remain in raised position by means of the dog 12. If, for any reason, it is found desirable to move the guard 32, this can readily be done, as it is pivoted at 23 and slidable in groove 34 so that it can be moved to the position shown by dash line in Fig. 5.

Having now described my invention, what I claim as new is:

1. In combination a saw table, a saw rotatably mounted thereon, a bracket secured to one side of said table, an arm pivoted to said bracket so as to swing in a plane substantially perpendicular to the plane of the saw, a transverse bar having a member extending therefrom at right angles, said member being slidably connected to the arm so as to permit the transverse bar to be adjusted to positions at various distances from the pivot of the arm, said transverse bar member lying in a plane which coincides with the plane of the saw, a second bar pivotally connected to said transverse bar at a point to the rear of the axis of the saw so as to be movable in a plane parallel with the plane of the saw, and a guard member connected to the forward free end of said bar, said guard member having a groove which receives one end of the transverse bar whereby the guard member is guided.

2. A guard for circular saws comprising, in combination, a bracket adapted to be secured to one edge of a saw table, an arm pivotally connected to the upper end of said bracket, a bar carried by said arm and extending transversely thereof in a plane substantially parallel with the pivot, one end of said transverse bar having a pivot attached thereto, a bar oscillatively mounted on said pivot, a guard member secured to the free end of said bar, guide means comprising a groove in said guard member which receives one end of the transverse bar, and a second guard member comprising a piece of sheet metal pivotally mounted on said pivot, said first guard member having a groove for the reception of the free end of said second guard member.

3. A guard for circular saws comprising, in combination, a bracket adapted to be secured to one edge of a saw table, an arm pivotally connected to the upper end of said bracket, a bar carried by said arm and extending transversely thereof in a plane substantially parallel with the pivot, one end of said transverse bar having a pivot attached thereto, a bar oscillatively mounted on said pivot, a guard member secured to the free end of said bar, guide means comprising a groove in said guard member which receives one end of the transverse bar, a second guard member comprising a piece of sheet metal pivotally mounted on said pivot, said first guard member having a groove for the the reception of the free end of said second guard member, said second guard member having its upper edge bent at an angle to the main body portion thereof, and means for holding said arm in adjusted relation to the bracket, said means comprising a pawl carried by the bracket.

4. In combination, a saw table, a circular saw blade rotatably mounted thereon, a bracket member secured to the table at a point spaced from the side of the saw, an arm pivotally connected to said bracket, a transverse bar having a member extending therefrom at right angles, said member being adjustably connected to said arm, a plurality of pawls of various lengths pivotally connected to said transverse arm, a second arm pivotally connected to one end of the transverse arm and movable in a plane parallel with the plane of the transverse arm, said last plane being substantially coincident with the plane of the saw blade, a guard member secured to the end of the second arm, said guard member projecting below the bar and resting on the top of the table when the saw is inoperative, said guard having a groove adapted to receive one end of the transverse bar for the purpose of guiding the guard, a second guard movably connected with said second arm, and means for guiding said second guard.

In testimony whereof I affix my signature.

ANDREW FLOHR.